United States Patent
Bruggendick et al.

(10) Patent No.: US 8,062,600 B2
(45) Date of Patent: Nov. 22, 2011

(54) ARRANGEMENT FOR SEPARATING COARSE ASH OUT OF A FLUE GAS STREAM

(75) Inventors: Hermann Bruggendick, Schembeck (DE); Wolfgang Benesch, Bochum (DE); Ralf Gilgen, Velbert (DE)

(73) Assignee: Evonik Energy Services GmbH, Essen (DE)

( * ) Notice: Subject to any disclaimer, the term of this patent is extended or adjusted under 35 U.S.C. 154(b) by 219 days.

(21) Appl. No.: 12/421,401

(22) Filed: Apr. 9, 2009

(65) Prior Publication Data
US 2009/0202401 A1   Aug. 13, 2009

Related U.S. Application Data

(62) Division of application No. 11/354,298, filed on Feb. 14, 2006, now Pat. No. 7,531,143.

(30) Foreign Application Priority Data

Feb. 14, 2005   (EP) .................................... 05003113

(51) Int. Cl.
*F01N 3/08*       (2006.01)
*B01D 50/00*      (2006.01)

(52) U.S. Cl. ........................................ 422/176; 422/177
(58) Field of Classification Search .................. 422/168, 422/176, 177, 180
See application file for complete search history.

(56) References Cited

U.S. PATENT DOCUMENTS

| 5,043,146 A | 8/1991 | Ishikawa et al. |
| 5,318,755 A | 6/1994 | Kuivalainen et al. |
| 6,994,036 B2 | 2/2006 | Grommes et al. |

FOREIGN PATENT DOCUMENTS

| DE | 44 36 207 | 7/1995 |
| WO | WO2004/079034 | 9/2004 |

*Primary Examiner* — Tom Duong
(74) *Attorney, Agent, or Firm* — K&L Gates, LLP

(57) ABSTRACT

An arrangement for separating coarse ash out of a flue gas stream, comprising a catalytic converter disposed in a widened flue gas channel portion and serving for reducing the $NO_x$ level in the flue gas stream. Also disposed in the widened channel portion is a separator sieve that extends essentially over the entire cross-section thereof. The separator sieve is provided with a plurality of openings for the passage of flue gas therethrough. Each opening has a cross-section that is smaller than a cross-section of coarse ash particles that are to be separated out.

3 Claims, 3 Drawing Sheets

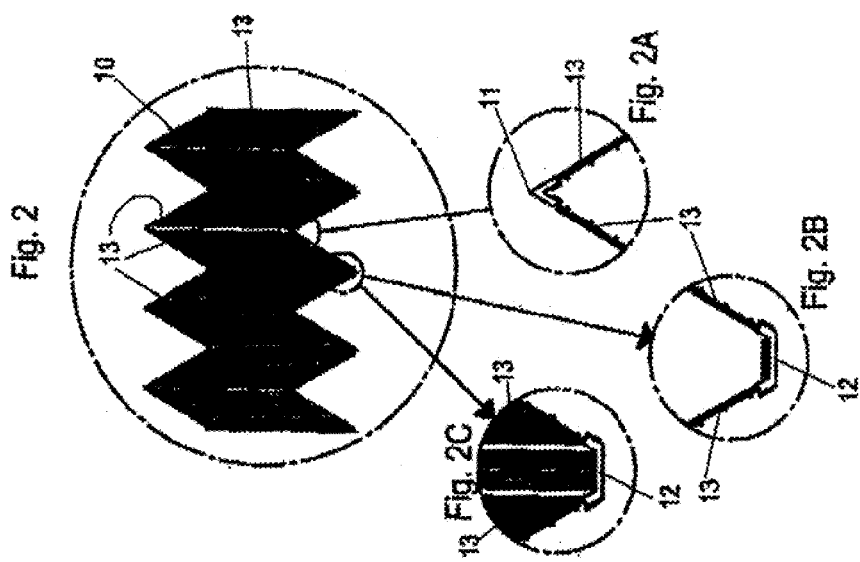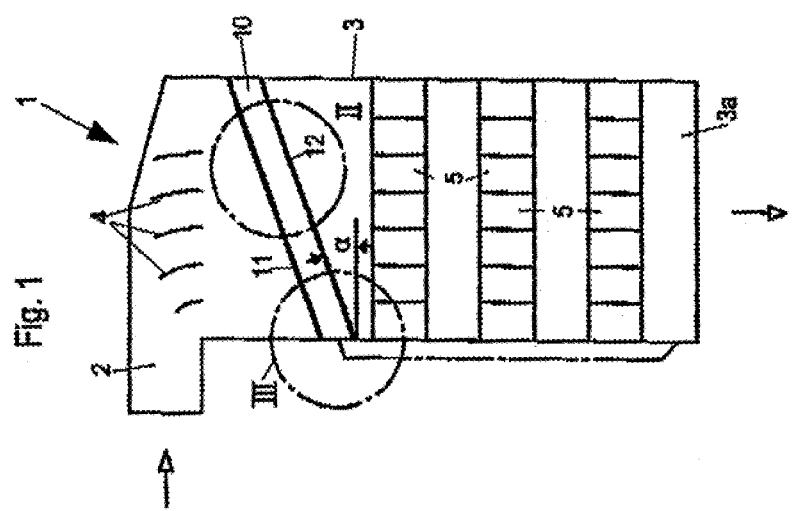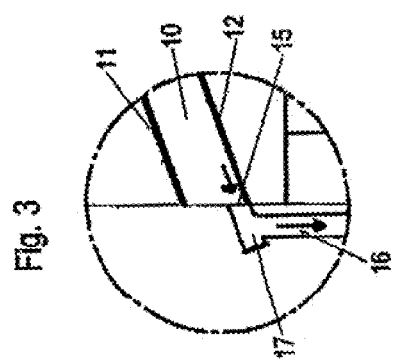

ARRANGEMENT FOR SEPARATING COARSE ASH OUT OF A FLUE GAS STREAM

The instant application is a divisional application of U.S. application Ser. No. 11/354,298 and should therefore be granted the priority date of Feb. 14, 2005, the filing date of the corresponding European patent application EP 05 003 113.7.

BACKGROUND OF THE INVENTION

The present invention relates in general to the field of coal-fired power stations having a dry firing, and in particular to an arrangement for separating coarse ash out of a flue gas stream, a separator sieve being disposed in a flue gas channel that leads to a catalytic converter for reducing the $NO_x$ level and/or a heat exchanger for pre-heating combustion air.

During dry firings in a coal-fired power plant, ash is produced as dry dust that is partially carried along by the flue gas stream. As a function of the type of coal and the temperature distribution within a combustion chamber, an exceeding of the ash-softening point can occur locally. As a result, the originally dry and pulverous ash particles stick together or even sinter together. The resulting coarse ash particles (popcorn ash) can, as is known, clog the channel walls of catalytic converters, provided for reducing the $NO_x$ level, of flue gas cleaning devices, and/or can lead to significant pressure drops in the catalytic converter, in the following air pre-heater and/or in the electrostatic filter.

Commonly owned U.S. Pat. No. 6,994,036 discloses separating coarse ash out of the flue gas stream, before it reaches the catalytic converter, with the aid of a sieve arrangement that can be pivoted out of a rest position against the effect of a return force. The flue gas stream is subjected to constant, slight vibrations that suffice to cause movements or vibrations at the sieve arrangement. This causes the coarse ash particles that have been separated off on the sieve and adhere to the sieve surface to be shaken off.

With this known arrangement, the separator sieve is disposed approximately vertically at the inlet of a flue gas channel. The coarse ash particles are shaken off into an ash hopper that precedes the sieve.

At high flue gas flow velocities, the metallic meshes of the known separator sieve are subjected to considerable abrasion effects from ash particles that strike the sieve and pass through the sieve. Due to this abrasion effect, sieve openings result through which the coarse ash can pass, thereby partially reducing the separation function of the sieve arrangement. For this reason, in order to maintain their separation function, such separator arrangements must be checked, serviced and possibly replaced, whereby the power plant must sooner or later be briefly shut down.

By using separator modules that at the in-flow side are made of a material having a high mechanical wear resistance, such as a ceramic or sintered material, the durability of the sieve arrangement in flue gas channels can be considerably improved at high flue gas flow velocities. Due to the large dimensions of the sieve cross-sections in the flue gas channel, such sieve arrangements of wear-resistant materials entail considerable manufacturing costs.

It is therefore an object of the present invention to provide a separator arrangement that is economical to produce, and that even at high flue gas flow velocities in the flue gas channel enable an excellent separation function and operation that is favorable with respect to maintenance.

BRIEF DESCRIPTION OF THE DRAWINGS

This object, and further objects and advantages of the present application, will appear more clearly from the following specification in conjunction with the accompanying schematic drawings of exemplary embodiments, in which:

FIG. 1 shows part of a flue gas channel having a relatively narrow, horizontal channel portion, a deflection portion provided with deflection elements, and a significantly widened vertical portion in which a sieve-like plate for separating out coarse ash is installed upstream of a catalytic converter for reducing the $NO_x$ level;

FIG. 2 is a perspective partial view of the sieve-like plate from the encircled portion II in FIG. 1;

FIG. 2A is a detailed view of part of a pleated sieve-like plate from an encircled portion of FIG. 2;

FIG. 2B is a front view of a groove formed between two adjacent sieve plate portions;

FIG. 2c is a perspective partial view of the groove region, the individual sieve sections and the groove base being embodied as a bar screen;

FIG. 3 is a detailed view of the encircled portion III of FIG. 1;

SUMMARY OF THE INVENTION

Figure 4:
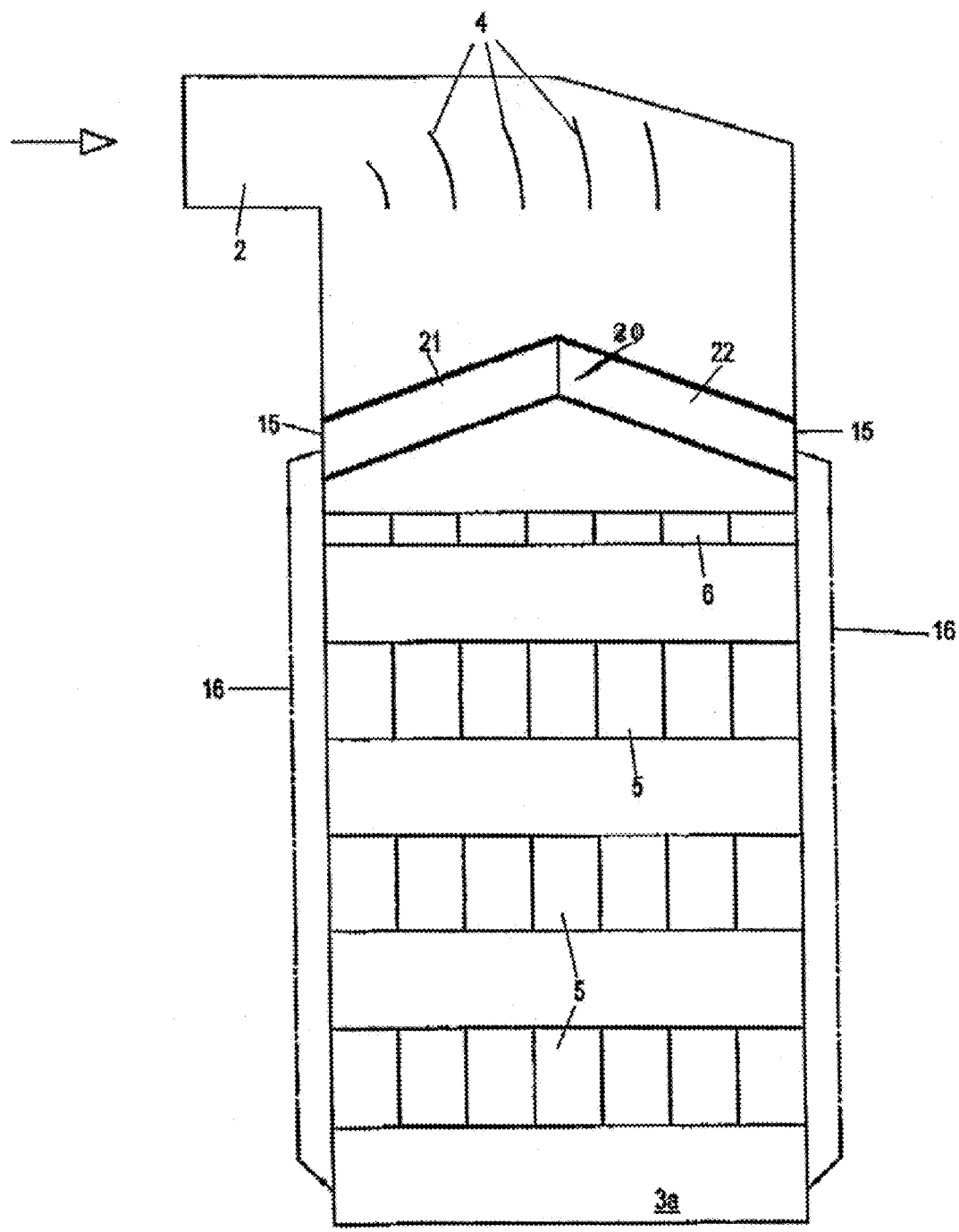
FIG. 4 is a vertical cross-sectional view similar to that of FIG. 1 through a modified embodiment of the invention, wherein a ridged roof shaped sieve-like plate is installed in the upper widened and vertically disposed flue gas channel portion that adjoins the deflection area, and wherein a flow straightening means is disposed between the ridged roof shaped separator plate and the first stage of the catalytic converter for reducing the $NO_x$ level.

With the separating arrangement of the present application, the catalytic converter for reducing the $NO_x$ level in the flue gas stream is disposed in a widened channel portion of the flue gas channel, and the separator sieve is also disposed in the widened channel portion, wherein the separator sieve extends over essentially the entire cross-section of the widened channel portion and is provided with a plurality of openings for the passage of flue gas therethrough, each opening having a cross-section that is smaller than the cross-section of coarse ash particles that are to be separated out.

With this approach, the present application proceeds from the consideration that the flue gas channel portion that accommodates the catalytic converter for reducing the $NO_x$ level has a relatively large opening cross-section even when the flow velocity in the generally considerably narrower flue gas channel portion that is close to the boiler is high. Consequently, the flow velocity, and hence the abrasion effect, are considerably less in the flue gas channel portion that accommodates the catalytic converter, as a result of which the durability of the sieve arrangement is improved many times over, even when expensive metallic sieve materials are used.

Pursuant to a preferred embodiment of the invention, the widened portion of the flue gas channel extends essentially vertically and adjoins a narrower, essentially horizontal flue gas channel portion, deflection elements are disposed in the connection region, and the separator sieve is disposed downstream of the deflection elements and upstream of a flow straightening means that is in turn disposed upstream of the catalytic converter. In this connection, the separator sieve is preferably embodied as a separator plate that is inclined relative to a horizontal plane at an angle of inclination of $10°<\alpha<50°$ and that is installed in the vertical portion of the flue gas channel. Formed in the region of the lower end of the separator plate is at least one discharge opening in an adjacent wall of the flue gas channel for the withdrawal of the coarse ash particles that are separated out. The at least one discharge opening can be connected by an external bypass line with the flue gas channel downstream of the catalytic converter arrangement.

To enlarge the surface area of the sieve-like plate, and hence to further reduce possible abrasion effects, it is proposed pursuant to a further development of the invention that the sieve-like plate be composed of sections that are folded or pleated in a zigzagged manner, with the fold lines thereof extending in the direction of incline. Between each two V-shaped adjacent pleat sections of the sieve-like plate, a groove can be formed for the withdrawal of the coarse ash particles that are separated out. In this connection, each groove is preferably connected to a discharge opening.

The angle of inclination is such that the coarse ash particles that are separated out flow or are shaken off toward the side in the direction of the discharge opening under the force of gravity, aided by the slight pulsations of the flue gas stream that are generally present.

A particularly durable embodiment that favors a flowing or shaking off of the coarse ash particles that are separated out is characterized in that the separator sieve is embodied as a bar screen, according to which the openings are gap shaped and are delimited by parallel rods that have an approximately triangular cross-section and are interconnected, to form a rigid module, by transversely extending tie bars, whereby the gap-shaped openings have a cross-sectional area that increases from the entry side to the exit side.

Pursuant to a preferred further development of this construction, two bar screen modules are interconnected in an essentially V-shaped manner to form a plate groove, and the bar screen bars that delimit the openings are disposed essentially at right angles to the path or orientation of the grooves in order to convey the coarse ash particles into the groove. On the bars of the bar screen the coarse ash particles that are separated out can flow off in an unobstructed manner into the groove, and from there can be conveyed to the discharge opening. This withdrawal of the coarse ash particles via the grooves is enhanced by a suitable inclination of the grooves relative to a side wall of the flue gas channel portion.

If the installation conditions in the portion of the flue gas channel that accommodates the catalytic converter for reducing the $NO_x$ level do not permit a suitable inclination of the groove, the withdrawal of the coarse ash particles via the groove can be improved, for example, by acoustical horns to produce shock waves or by other suitable particle-conveying measures.

Further specific features of the present invention will be described in detail subsequently.

DESCRIPTION OF SPECIFIC EMBODIMENTS

Referring now to the drawings in detail, FIG. 1 illustrates a schematic partial view of a flue gas channel 1 having a horizontal channel portion 2 and a vertical channel portion 3, i.e. a channel portion that is perpendicular to the channel portion 2, that is considerably wider than the horizontal channel portion 2. Disposed in the transition zone between the narrow channel portion 2 and the widened channel portion 3 is a group of vane-like deflection elements 4 that deflect the flue gas stream vertically downwardly and distribute it over the widened cross-section of the flue gas channel portion 3. In the upper part of the channel portion 3, downstream of the deflection elements 4 yet upstream of the multi-stage catalytic converter 5 for reducing the $NO_x$ level, a perforated of sieve-like plate or similar element 10 that serves for the separation of coarse ash and that is inclined relative to the horizontal is installed. As will be described in greater detail subsequently, the sieve-like plate 10 comprises a plurality of openings for the passage of flue gas, whereby each opening has a cross-section that is smaller than a cross-section of the coarse ash particles that are to be separated off. The separator sieve or plate 10 extends essentially over the entire cross-section of the widened flue gas channel portion 3.

The sieve-like plate 10 of the embodiment described has a pleating that serves for enlarging the surface area of the sieve and is schematically illustrated in FIG. 2. The configuration of the top or ridge 11 is shown in FIG. 2A and the configuration of the groove 12 that is formed at the bottom between two sieve portions 13 that are adjacent to one another is shown in FIG. 2B.

In the embodiments described, all of the sieve modules or portions are embodied as bar screens, whereby the parallel bars that define the gaps of the sieve are, pursuant to the illustration in FIG. 2C, disposed essentially at right angles to the path or orientation of the adjacent groove 12. This arrangement of the bar screen has the advantage that ash particles that are separated off at the pleated bar screen portions slide down on the respectively parallel bar screen bars under the influence of gravity and under the influence of the flue gas stream, and fall into the groove 12. The function and configuration of the bar screen will be described in greater detail subsequently in conjunction with FIG. 5.

In conformity with the incline of the overall plate 10, the grooves 12 of the pleated sieve portions or bar screens modules 13 are inclined downwardly from the upper right to the lower left, and are in communication with a discharge opening 15 that is disposed in an adjacent side wall of the flue gas channel portion 3. By means of a bypass line 16 that extends along or in the flue gas channel portion 3, the discharge opening 15 is connected with the flue gas channel portion 3a downstream of the catalytic converter arrangement 5. This arrangement has the advantage that the coarse ash particles that are separated off are returned into the flue gas stream while bypassing the catalytic converter 5 and are not harmful to the sensitive catalytic converter stages that are provided for reducing the $NO_x$ level. Furthermore, the pressure drops over the catalytic converter arrangement can be utilized for improving the transport of the coarse ash particles that are separated off. Not only the grooves 12 but also the bypass line or channel 16 are accessible by means of a closable inspection opening 17.

The incline illustrated in FIG. 1 normally suffices for moving the separated-off coarse ash particles along the parallel grooves 12 and suitable connecting paths to the discharge opening 15. This is all the more true since the exhaust or flue gas stream is deflected at the exit surfaces of the separator sieve and is swirled, as a result of which coarse ash particles that adhere are loosened from their separator locations. The bar screen effect is furthermore extremely favorable for cleaning the sieve pleats, since toward the downstream or discharge side the gaps enable an unobstructed rolling off of coarse ash particles, which is in contrast to conventional meshes or interwoven sieves.

The arrangement schematically illustrated in FIG. 4 differs from that of FIG. 1 in that in place of a sieve-like plate 10 that is inclined toward one side, a sieve-like plate 20 in the shape of a gable roof or ridged roof is installed in the widened portion 3 of the flue gas channel. The installed position of the ridged rooflike sieve plate 20 corresponds in principle to that of the sieve plate 10 that is inclined toward one side. Downstream of the ridged roof like sieve plate 20, and upstream of the catalytic converter arrangement 5, a straightening means 6 is installed that is intended to straighten the flow exiting the pleated sieve-like plate 20 approximately into the vertical direction. Such straightening means are known.

The configuration of the two oppositely inclined sections 21 and 22 of the ridged roof plate 20 respectively corresponds to that of the separator sieve 10 in the embodiment of FIG. 1. With the ridged roof shape of the embodiment of FIG. 4 discharge openings 15 and bypass lines 16 are disposed on two opposite side walls of the flue gas channel portion 3, and in particular in such a way that the ash particles, which respectively flow off toward the side (in opposite directions) via the grooves, are conveyed into the channel portion 3a downstream of the catalytic converter arrangement 5 via separate bypass lines 16.

Figure 5:
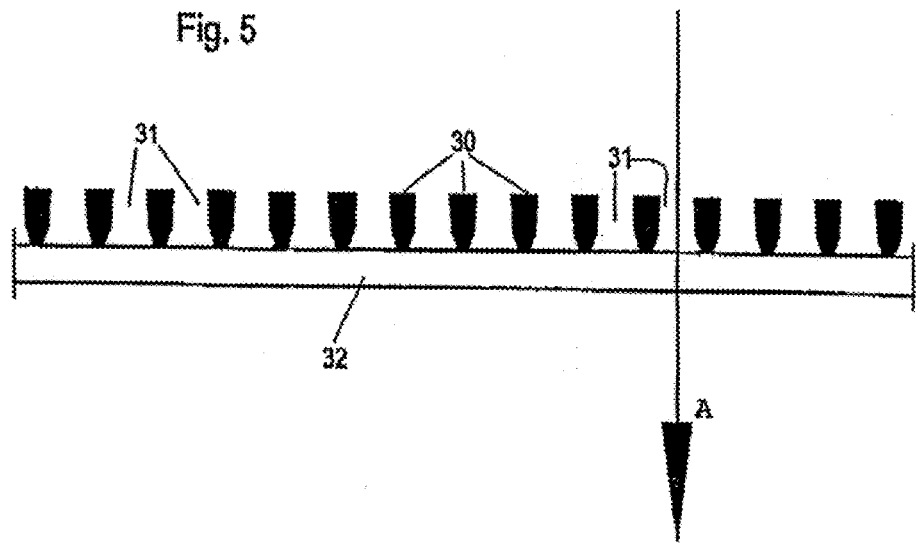
FIG. 5 is a cross-sectional view of a bar screen that, pursuant to a preferred embodiment of the invention, is used as a coarse ash separation module.
Figure 6:
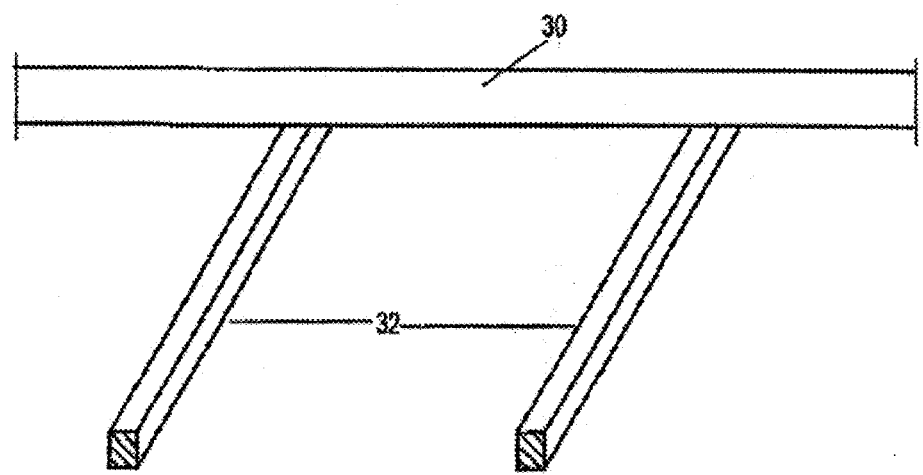
FIG. 6 is a cross-sectional view through the crossbars or tie bars of a bar screen embodiment that is modified relative to FIG. 5, the tie bars being embodied as flow straightener elements.

FIG. 5 is a schematic cross-sectional view through part of a bar screen. As can be seen, the parallel sieve bars 30 have an approximately triangular cross-sectional profile and delimit gaps or openings 31 that are widened in the direction of flow, which is designated by the arrow A. The downstream edges of all of the bars 30 that are part of a sieve module are interconnected by tie bars or crossbars 32 to form a rigid structural component. As can be seen, the coarse ash particles that collect on the surface of the bar screen at the entry of the gaps can slide or roll off in an unobstructed manner in the direction of the gap, as a result of which even a slight inclination of the sieve-like plate, for example in the range of between 10 and 30°, under unfavorable conditions up to 50°, is adequate to keep the rolling-off mechanism in motion. The use of a bar screen as the sieve-like plate 10 or 20 enables, with a suitable configuration of the connection tie bars 32, the integration of the straightening function of the flow straightener means 6 (FIG. 4) into the sieve-like plate 10 or 20. FIG. 6 schematically illustrates how the connecting tie bars 32 can, for example, be laid out in order to fulfill the desired straightening function with the bar screen. The inclination of the rib-like connection tie bars 32 conforms to the inclination of the modules of the separator sieve 10 or 20; desired is a positioning of the ribs 32 approximately parallel to the direction of passage of the flow through the catalytic converter arrangement 5, i.e. vertically. However, deviations herefrom are not harmful, especially if the flow velocities in the widened portion 3 of the flue gas channel are relatively low.

Numerous modifications would be understood by one of skill of the art to be within the scope of the inventive concept. For example, a separator sieve can extend or be disposed approximately horizontally, in other words parallel to the first stage of the catalytic converter for reducing the $NO_x$ level, possibly directly on the inflow side thereof. Particularly in this arrangement the embodiment of the separator sieve as a bar screen has special advantages, since it can be cleaned relatively easily, whether by mechanical movement, shock waves, worm conveyors, or in a pneumatic manner. In addition, in comparison to conventional interwoven meshes, the bar screen has a considerably greater durability and therefore requires a correspondingly lower expenditure for maintenance.

However, pursuant to an alternative embodiment an interwoven mesh, preferably inclined, can also be installed into the widened portion 3 of the flue gas channel.

If the installation height for the sieve-like plate is low due to local conditions, the use of the ridged roof shaped construction of the sieve-like plate of FIG. 4 is recommended, since with such a construction the installation height, at the same inclination of the two sieve sections 21 and 22 (FIG. 4), is considerably lower than is the installation height of the sieve-like plate 10, which is inclined toward only one side.

The specification incorporates by reference the disclosure of European priority document EP 05 003 113.7 of 14 Feb. 2005.

The present invention is, of course, in no way restricted to the specific disclosure of the specification and drawings, but also encompasses any modifications within the scope of the appended claims.

We claim:

1. An arrangement for separating coarse ash out of a flue gas stream, comprising:
a catalytic converter for reducing an $NO_x$ level in said flue gas stream;
a flue gas channel that leads to said catalytic converter; and
a separator sieve disposed in said flue gas channel and extending essentially over an entire cross-section of said flue gas channel, wherein said separator sieve is provided with a plurality of gap-shaped openings for the passage of flue gas therethrough, wherein each of said openings has a cross-section that is smaller than a cross-section of coarse ash particles that are to be separated out, wherein said separator sieve is a bar screen having said openings, wherein said openings are delimited by parallel bars having an approximately triangular cross-sectional shape, wherein said parallel bars are interconnected, to form a rigid module, by tie bars that extend transverse to said parallel bars, and wherein said gap-shaped openings, when viewed in a direction of flow of flue gas therethrough, have a cross-sectional area that increases from an entry side to an exit side, wherein said flue gas channel includes a widened channel portion that accommodates said catalytic converter and extends essentially vertically, wherein said widened channel portion adjoins an essentially horizontal flue gas channel portion via a connection zone, wherein deflection elements are disposed in said connection zone, and wherein said separator sieve is disposed downstream of said deflection elements and upstream of said catalytic converter and wherein a flow straightening means is disposed in said widened channel portion upstream of said catalytic converter.

2. An arrangement according to claim 1, wherein said transversely extending tie bars are embodied as straightening ribs that are adapted to straighten the flue gas stream and convey it to said catalytic converter.

3. An arrangement according to claim 1, wherein said separator sieve is embodied as a separator plate that is disposed in said widened channel portion at an angle of inclination of $10° < \alpha < 50°$ relative to a horizontal plane, and wherein at least one discharge opening for a withdrawal of coarse ash particles that are separated out is formed in an adjacent wall of said flue gas channel in the region of a lower end of said separator plate.

* * * * *